United States Patent [19]

Steffano

[11] Patent Number: 5,764,306
[45] Date of Patent: Jun. 9, 1998

[54] REAL-TIME METHOD OF DIGITALLY ALTERING A VIDEO DATA STREAM TO REMOVE PORTIONS OF THE ORIGINAL IMAGE AND SUBSTITUTE ELEMENTS TO CREATE A NEW IMAGE

[75] Inventor: Michael D. Steffano, Austin, Tex.

[73] Assignee: The Metaphor Group, Irving, Tex.

[21] Appl. No.: 819,921

[22] Filed: Mar. 18, 1997

[51] Int. Cl.$^6$ .................................................... H04N 5/272
[52] U.S. Cl. ........................................ 348/586; 348/552
[58] Field of Search .................................... 348/586, 587, 348/588, 552; H04N 5/272

[56] References Cited

U.S. PATENT DOCUMENTS

| | | | |
|---|---|---|---|
| 4,160,994 | 7/1979 | Mendrala | 348/587 |
| 4,473,842 | 9/1984 | Suzuki | 348/126 |
| 4,562,466 | 12/1985 | Clapp et al. | 348/415 |
| 4,568,981 | 2/1986 | Beaulier | 348/589 |
| 4,621,280 | 11/1986 | Shinohara et al. | 348/587 |
| 4,646,134 | 2/1987 | Komatsu | 348/391 |
| 4,667,233 | 5/1987 | Furukawa | 348/415 |
| 4,800,432 | 1/1989 | Barnett et al. | 348/591 |
| 4,887,156 | 12/1989 | Ohki | 348/415 |
| 4,951,140 | 8/1990 | Ueno | 348/413 |
| 4,968,132 | 11/1990 | Ferren | 352/46 |
| 5,249,039 | 9/1993 | Chaplin | 348/587 |
| 5,264,837 | 11/1993 | Buehler | 345/115 |
| 5,379,129 | 1/1995 | Othmer et al. | 358/450 |
| 5,448,307 | 9/1995 | Gelissen et al. | 348/584 |
| 5,469,536 | 11/1995 | Blank | 395/131 |

Primary Examiner—Howard W. Britton
Attorney, Agent, or Firm—Jones, Day, Reavis & Pogue

[57] ABSTRACT

A method that allows the real-time replacement of the designated background portion of an incoming video signal with an alternate background. The method utilizes the actual background image for reference as the basis for determining the background and foreground elements within the image with the end result being comparable to traditional blue-screen processes, such as chroma-key and ultimate technology, but requiring only a personal computer, video camera and the software. In this case, however, the reference background image can be any reasonably static scene with a sufficient and stable light source captured by the camera. The video data stream is modified in real-time by comparisons against the reference background image and is then passed on to its original destination. Multiple signal-noise processing algorithms are applied in real-time against the signal to achieve a visually acceptable matte.

11 Claims, 2 Drawing Sheets

REAL-TIME METHOD OF DIGITALLY ALTERING A VIDEO DATA STREAM TO REMOVE PORTIONS OF THE ORIGINAL IMAGE AND SUBSTITUTE ELEMENTS TO CREATE A NEW IMAGE

BACKGROUND OF THE INVENTION

1. Field of the Invention

The present invention relates in general to digital image processing and in particular to a system and method for altering a real time video data stream to remove portions of the original image and substitute elements to create a new image without using traditional blue screen techniques.

2. Description of Related Art Including Information Disclosed Under 37 CFR 1.97 and 1.98

In the motion picture and video industries two or more images are often combined into a single scene. For example, an image of a weatherman may be combined with another image of a weather map to show the weatherman standing in front of the map. This technique of combining images is primarily achieved through the use of a "blue screen" process in which one image is photographed against a solid blue background and the second image is substituted in place of that blue background. This substitution can be made electronically or through optical photographic techniques.

Various improvements have been made to the prior art "blue screen"process. U.S. Pat. No. 4,968,132 discloses a traveling matte process to create male or female mattes that can be altered or corrected frame-by-frame on a computer and that can be used to create special effects in conventional cinematography and video recordings without the need for a blue screen background. Further, in U.S. Pat. No. 4,800,432, a video difference key generator has a stored reference video image. An input video image is compared with the reference video image by an absolute difference circuit that subtracts different corresponding pixels of the two video images, the smaller from the larger to produce a difference video image. The difference video image may be filtered and then is input to a transfer function circuit to produce an output that may be used as a key signal for compositing video images.

There would be a significant advantage to these background replacement methodologies if the laborious and time-consuming functions could be performed in real-time, if analysis of video frames could provide greater understanding of the image composition within each video frame, and if the use of blue screen techniques could be avoided altogether.

SUMMARY OF THE INVENTION

The present invention simplifies the process of removing the background scene from a video image and replacing it with an alternate background. A simple PC computer can be utilized instead of the complex computer systems of the prior art. In the present invention, a series of video frames (or a single frame) produced by a stationary video camera are captured. These image(s) and their slight frame-to-frame variations, such as lighting, color, shadow, subtle movements, and the normal variations produced by the video camera itself are passed to the computer from the camera where they are analyzed by the software to produce a mathematical description of the video, in real-time, as it is captured by the computer.

The mathematical description of the captured video is then used to analyze new video segments of the same scene to determine if any changes to the scene have taken place. Elements of the new video that fall within a preset tolerance relative to the original mathematical description, are defined as background. Elements of the new video that fall outside the preset tolerance are defined as foreground and can be isolated from the background. This understanding and isolation of the different foreground and background video elements allow modifications to be made to the new video stream.

For example, the background can be changed to an entirely new image while the foreground remains unchanged. The background image may be one of a moving video, a bitmap, or animation as desired.

Thus, the functionality of traditional blue screen processes are achieved without using a blue screen.

Therefore, it is an object of the present invention to remove the background image from a live video scene, in real-time, through the use of a software-only programming mechanism that employs a mathematical description of the elements of the live video scene and which does not employ traditional blue screen processes, and replaces the background image, in real-time, with an alternate background image including the original foreground elements.

Thus, the present invention relates to a method of digitally altering, in real-time, a live video scene, with a computer system having a memory, a visual display, and a stationary video camera connected to the computer such that the video signals from the camera pass to the computer where an altered video scene is formed. This is performed by first digitally capturing and then mathematically describing one or several frames of the live video scene, referred hereinafter as the "reference view", in a first data structure in memory. Next, each subsequent frame from the live video scene is digitized and captured by the computer, with each new frame mathematically described by the software and stored in a second data structure in memory. In real-time these first and second data structures are compared using multiple signal-noise processing algorithms, available to anyone sufficiently skilled in the art, and the background image of the reference view is mathematically removed from the newly captured frame. Additionally, at this stage, given that a mathematical description of a different background image in a third data structure in memory is available, such as recorded video, a bitmap, or animation, it may be substituted into the second data structure in place of the removed background image of the reference view thereby creating a new mathematical description of the digitized frame. Finally, the mathematical description of the frame is converted back into a video signal and displayed on the visual display, or transferred to any suitable destination such as a video-conferencing participant or a capture file. Thus, the output from this process gives the appearance that any foreground elements in the original video scene (the reference view) are now superimposed on a different background creating a new image.

BRIEF DESCRIPTION OF THE DRAWINGS

These and other features of the present invention will be more fully disclosed when taken in conjunction with the following DETAILED DESCRIPTION OF THE PREFERRED EMBODIMENTS in which like numerals represent like elements and in which.

DETAILED DESCRIPTION OF THE PREFERRED EMBODIMENT(S)

Figure 1:
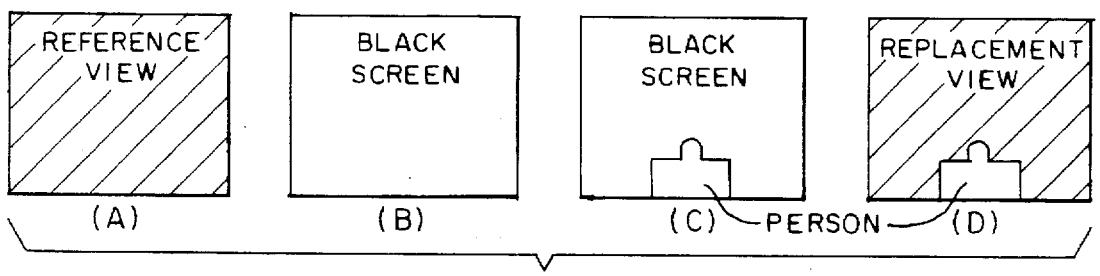
FIGS. 1(A)–(D) are representations of the display screen when it shows the reference view, the black (empty) screen it presents when the reference view has been mathematically removed, the black screen with new foreground elements detected, and a replacement view substituted for the reference view with the previous foreground elements forming a new image.

FIGS. 1(A)–(D) represent the basic steps in the novel process of the present invention. In FIG. 1(A) a reference view is captured and displayed on the computer's visual display. A reference view is defined as a mathematical description of a finite sequence of digitized video frames that is stored in a data structure in a computer memory location. It is used as the representative video scene for the separation of foreground and background elements from subsequently captured digital video frames. A reference view can be comprised of one or many digitized video frames depending upon the algorithm chosen.

Subsequent video scenes of the same view are mathematically removed from each captured frame by making comparisons against the reference view. Adjustments are made to the algorithm's parameters (either manually or automatically by the software) until the display screen is entirely empty (the color black was chosen in this case but it could have easily been white or any color) signifying complete removal in real-time of the reference view from the digitized video stream as illustrated in FIG. 1(B).

The display screen shown in FIG. 1(C) demonstrates the effect achieved when a person moves into the scene as captured by the video camera. Since the person was not a part of the reference view, he is considered by the software process a foreground element and appears superimposed in front of the black background. All of the scene, except for the person, is being mathematically removed from the digitized video stream in real-time by the software.

FIG. 1(D) demonstrates the ability to replace the removed reference view with an alternate view. A computer graphic, animation, or video may be digitally substituted for the reference view giving the appearance the person is in front of the alternate view. Thus the results shown in FIG. 1(D) demonstrate how foreground and background elements have been digitally rearranged resulting in a new image.

Figure 2:
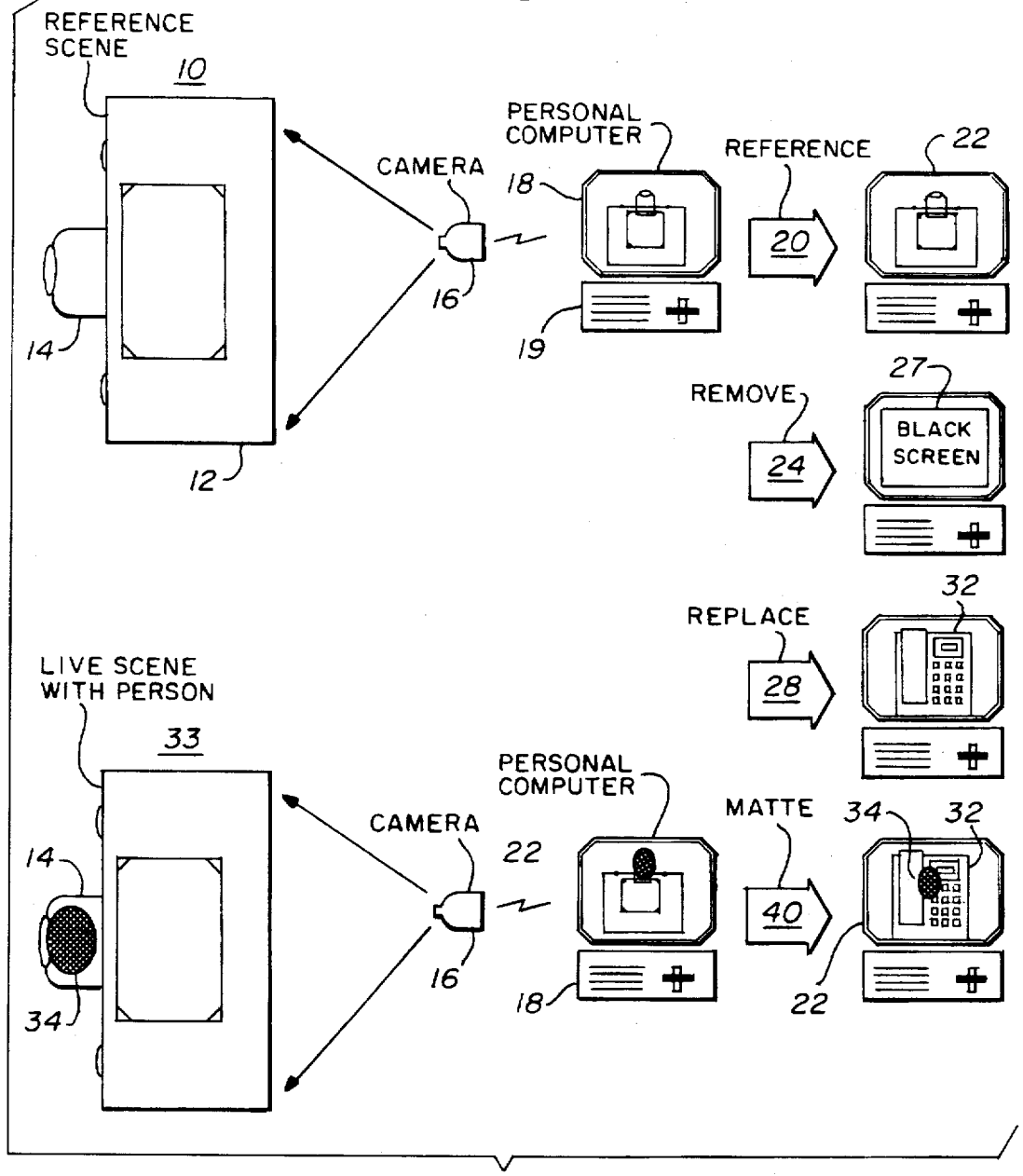
FIG. 2 is a schematic representation of the manner in which the screens in FIG. 1 are obtained.

FIG. 2 illustrates the apparatus of the present invention for creating the new image. The reference view 10 includes a desk 12 and a chair 14 defined as the visual image captured by the camera 16. The reference view should be free of unnecessary motion and should be illuminated by stable and strong overall lighting for the best effect.

The camera 16 must be mounted in a stable position and is connected to a personal computer 18. The personal computer 18 will include the appropriate video software and hardware required by the camera when it is installed and operational. Video software can include operating system video drivers, compressors, decompressors, and applications of software such as video conferencing or video editing software. The personal computer 18 digitizes the captured reference view, stores it in a first location of its memory schematically represented by unit 19 and displays it. The personal computer 18 contains a software system running in its random access memory (also represented schematically by unit 19). The software system captures the video signal from camera 16 as each frame that is indicated to be part of the reference view appears. The subsequent frames are captured as indicated by reference numeral 20. To achieve superior results, the scene being viewed by the camera 16 should be reasonably free of movement and well lighted. The reference phase 20 of the software builds a set of data structures, easily understood by anyone sufficiently skilled in the art, containing values that represent the scene, the dynamics of the lighting, and variations in the pixel values caused by the camera receptors. The reference phase is adjustable to allow for optimum rendering of the scene. The reference scene 10 is displayed on the computer's monitor 22 to allow for easy adjustments by the operator. The software also allows for automatic adjustment. Phase 24 represents the removal phase of the software system that mathematically removes the reference view from the captured video signal, thus leaving an empty view 27 (represented here by the color black) on the computer's monitor 22. The removal phase requires processing by multiple passes of signal-noise processing algorithms (well known in the art) against the data representing each captured frame of the video scene to create a visually acceptable empty view 27. "Visually acceptable" is defined as a solid unwavering single color (black was chosen here) video image.

The replacement phase 28 of the software allows the replacement, in real-time, of an alternative background image onto the resultant video signal. The replacement scene 32 is also stored in another computer memory location also represented schematically by unit 19 and can be a moving video, a bitmap, or animation. Any type of visual image or set of images can be placed on the empty view. The replacement image is mapped pixel-by-pixel to the empty pixels left when the reference view was removed. Since the pixels map from an identical coordinate system to the reference view, the replacement image is displayed as would be expected. The new replacement scene 32 is then displayed on the computer monitor 22 as shown.

The operator 34 now enters the camera's view adding a new element to the captured video scene 33. The video scene is captured by the same camera 16. The incoming video signal representing the video scene 33 is stored in another computer memory location in unit 19 and is displayed on monitor 22 of computer 18. That signal passes to the matting phase as depicted by the numeral 40 and is processed such that only the mathematical difference, within adjustable tolerances, between the live scene 33 and the original reference view 10 (in this case, the person 34) is displayed upon the replacement view 32 transforming it into the new image. The new image shown on display monitor 22 includes the alternate scene 32 and the added person 34. Best results are achieved if the operator is not wearing colors that correspond directly to colors that are directly posterior in the reference view 10. The result is similar to the blue-screen processes and can cause a bleed-through effect. Unlike blue-screen processes, however, certain parameters within the software (since it has an understanding of the visual elements within the scene) can account for a percentage of the bleed-through effect and remove it.

As stated earlier, alternate scenes that can replace the reference view are easily swapped in and out of the video stream. The process scales quite well to color video, although there is a correspondingly larger demand on the central processing unit of the PC, due to the greater data requirements of color. A moving video background may be replaced into the live video screen giving the appearance of an office meeting.

Figure 3:
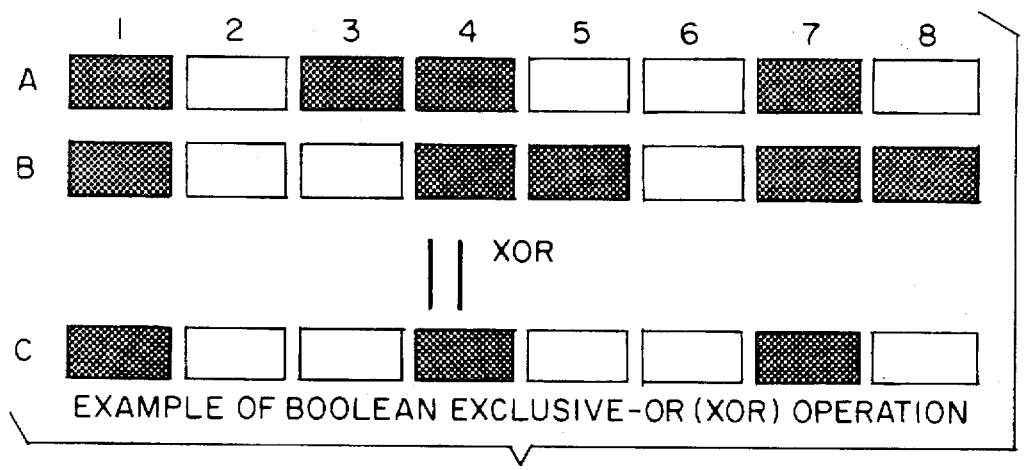
FIG. 3 is a representation of the mathematical boolean exclusive-OR operation that matches duplicate bit values between two matching sets of boolean data and which represents a reference view stored in standard digital data format with the reference view then being digitally compared to data representing the live video scene to leave only data that is not present in both scenes.

FIG. 3 illustrates a simplistic boolean exclusive-OR arrangement, known to anyone skilled in the art, that matches duplicate bit values between two matching sets of binary data and which is conceptually utilized in the present process to obtain an empty view. Consider the eight bits of row A to be the stored reference view and the eight bits of row B to be a captured frame from the subsequently captured incoming video. If the eight bits of row B were identical to the eight bits of row A and they were subject to an exclusive-OR operation, the output would be all zeros or an empty frame would be generated. Given that row B illustrates the eight bits of the video scene 33 as shown in FIG. 2 and displayed on computer display 22, by performing an exclusive-OR operation between rows A and B, row C is obtained. Note the only data shown exists where there has been a change in the video scene compared to the reference view. Thus, the only information that is displayed 1is the change in data represented by bits 3, 5, and 8.

Thus, summarizing, the reference view is captured in row A and stored in standard digital data format. It is then subject to an exclusive-OR operation to data representing a live video scene of the same view and shown in row B. The common data present in both scenes then can be subtracted out of each frame of the live video. In a perfect world, this would be the only operation necessary to achieve a perfect matting effect. However, in reality, an entire series of advanced signal-noise processing algorithms must be applied against the data multiple times to achieve this separation of foreground and background elements due to variances in lighting and shadows over time, subtle movements in the reference view, and the digital quantification effects of the CCD video camera on pixels between successive frames. The iterative use of such series of algorithms is well known to those skilled in the art.

Figure 4:
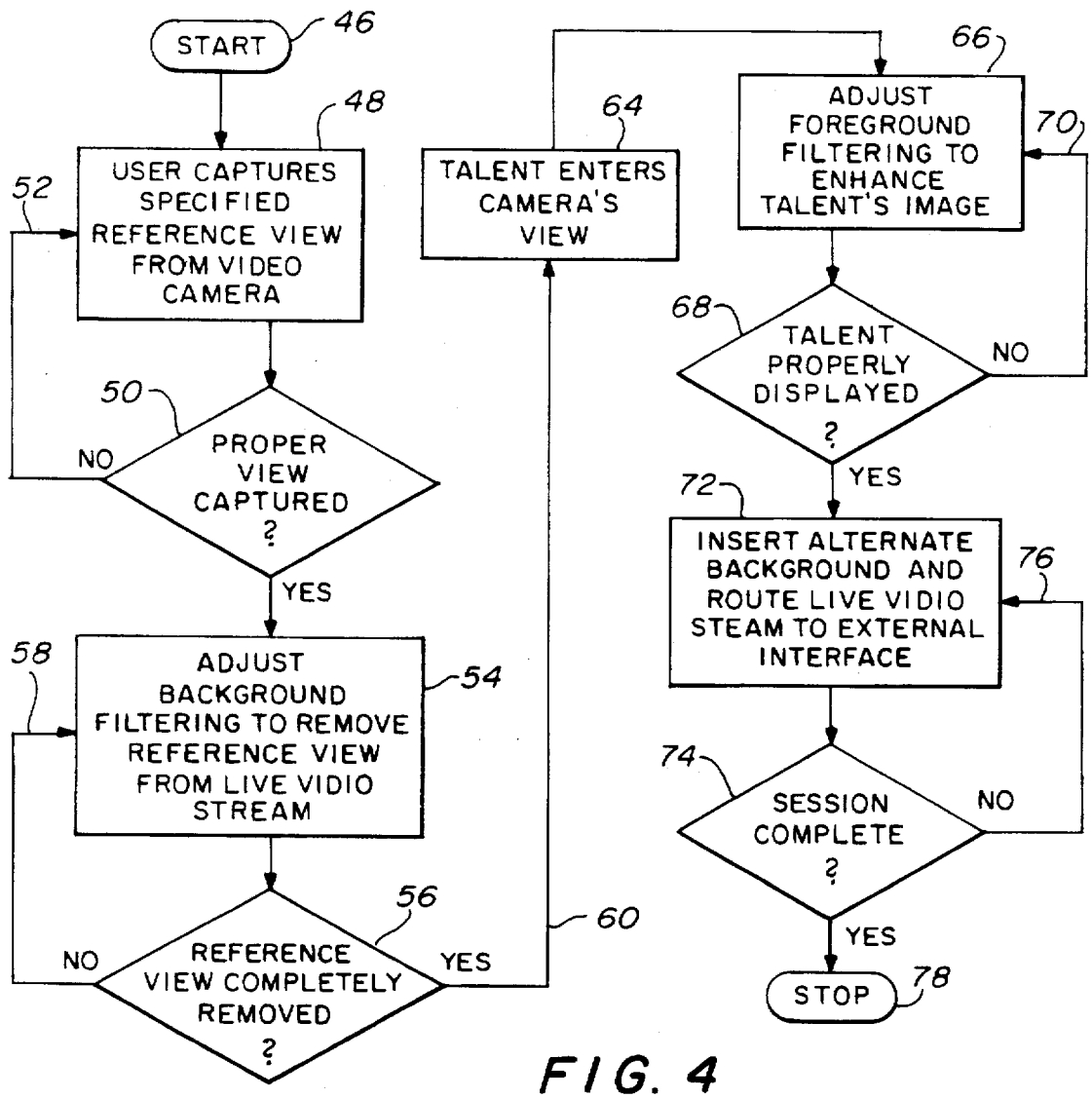
FIG. 4 is a flow chart illustrating the novel steps of the present invention.

FIG. 4 illustrates the novel process of the present invention. Thus, the process starts at step 46. At step 48, data representing live video is routed from an input device such as a video camera into a computational device such as a PC. Within the PC, it is converted into a digital representation of the analog data (if that has not already been performed by the camera) and moved into a representative data structure at a memory store. This is the reference view that is captured.

At step 50, a decision step, it is determined if the proper scene is captured. If not, the process is routed at 52 back to step 48 until the proper scene is captured. This is visually determined by the operator of the software.

When the proper scene has been captured, at step 54, using the data from the reference view initially stored at step 48, a series of algorithms are applied against digitized captured frames from the current video feed. The algorithms attempt to match the chrominance and luminance values for pixels in corresponding positions within each frame to the corresponding chrominance and luminance pixels initially stored as the reference view in step 48. When a match is determined, this pixel position within the frame is marked as empty.

Due to variances in lighting, shadows, movement, and the quantification effect when analog data is converted to digital data, the pixels corresponding to the same view within subsequent frames can vary in their values. Thus, data structures representing all this information are created and maintained by the software within memory. Subsequently, sophisticated, well-known signal-processing algorithms, or "filters", are applied against the incoming video data to accurately identify pixels as matching between frames and thus marking them as empty In this manner the reference view captured at step 48 is eliminated from the captured video scene. This process is repeated for every captured frame of incoming video data. At decision step 56, it is determined if the reference view is completely removed from the captured video. The degree of background removal can be adjusted manually or automatically by the software to remove the maximum amount of the reference view from the current video feed. If the scene is not completely removed, the process reverts along 58 back to step 54. If the reference view is sufficiently removed as determined by the software or the operator, the process moves at 60 to step 64 where the scene is varied as by a user entering the video camera's view. Typically in this step, a person (referred to in the production industry as "talent") enters the scene being captured by the video camera. Since the talent pixel data is not a part of the reference view, the software recognizes that the talent pixel values do not match the original pixel values and considers them foreground elements. The talent pixels are not removed and subsequently appear within an empty frame of video as shown in FIG. 1(C). At step 66, additional signal-noise processing algorithms may be applied against the captured video feed to enhance the image of the talent or "hero" in the empty frame as shown in FIG. 1(C). These filters may be quite sophisticated. For example. if the talent's tie matches the color of the background in the reference view shown in FIG. 1(A), "bleed-through" is observed. However, with an appropriate filtering algorithm applied, sophisticated guesses can be made by the software to exclude the tie from being marked as empty (since it matches the pixel data of the reference view directly posterior to the tie) based on the fact that it is surrounded by foreground elements. This is an important feature that traditional broadcast technology, such as chroma-key and ultimate cannot achieve. The implementation of these filters may be done manually or automatically by the software.

At step 68, if the image of the talent is acceptable, the process moves to step 72. If not, it reverts at 70 back to step 66 where the filters continue to be manipulated until the talent is properly displayed at step 68.

When the talent is properly displayed at step 68, the process moves to step 72 where an alternate background can now be substituted for the empty portions of the video scene. This new image may be any graphical image capable of being represented digitally within a computer system and will create the illusion that the talent is now in front of the new background. The substitution of the new image is achieved by replacing the corresponding empty pixels with the corresponding pixels of the new image on a frame-by-frame basis. Using this technique, if the talent moves, he will appear to be moving in front of the new background. The background may be a pre-recorded video which can be manipulated frame-by-frame. This gives the effect of the talent in front of a moving background.

If the session is complete at step 74, the process stops at step 78. If the session is not complete, the process moves at 76, back to step 72.

Thus, there has been disclosed a novel system which allows the real-time replacement of the designated background portion of an incoming video signal with an alternative background. The system utilizes the actual background image of the reference view as the basis of creating a new video image with the end result being comparable to traditional blue-screen processes, such as chroma-key and ultimate technology, but requiring only a personal computer, video camera, and the software. In this case, however, the background image can be any reasonably static scene with a sufficient and stable light source captured by the video camera. The video stream is modified in real-time and then is passed on to its original destination.

The corresponding structures, materials, acts, and equivalents of all means or step plus function elements in the claims below are intended to include any structure, material, or act for performing the function in combination with other claimed elements as specifically claimed.

What is claimed is:

1. A method of digitally altering a video data stream representing an original image in real-time, using a computer system having a memory, and a visual display screen, to remove portions of the original video image and substitute new elements to create a new video image comprising the steps of:

storing at least one frame of data representing said original image in a first incoming video data stream in a data structure in a first location in said memory in a computer;

displaying said stored original image on said visual display;

capturing real-time video from a second incoming video data stream representing a subsequently modified original image and storing data representing said modified original image in a data structure in a second location in said memory in a computer;

comparing video data in the second video data stream representing said original image with modifications with said stored original image video data to differentiate the background and foreground elements;

removing the common background elements of said stored original image and the subsequently modified original image leaving only foreground elements of said subsequently modified original image;

replacing said background elements of said subsequently modified original image with alternate background replacement elements; and displaying only the foreground elements in said subsequently modified original image upon the said alternate background replacement elements to form said new image.

2. The method as in claim 1 further comprising the steps of:

using a stationary video camera to obtain said original image in the form of said first incoming video data and said subsequently modified original image in the form of second incoming video data;

coupling said camera first and second incoming video data to said computer; and digitizing said first incoming video data of said original image and said second incoming video data of said second real-time video data stream for storage in respective first and second locations in said memory.

3. The method as in claim 2 further comprising the steps of:

causing said original image to be reasonably free of movement; and lighting said original image sufficiently to enable the detection and separation of background and foreground elements when said digitized second real-time incoming video data stream is compared with said stored digitized original image.

4. The method as in claim 3 further comprising the steps of:

creating said first and second video signals with pixel receptors in said video camera, each pixel receptor generating an output signal containing values that represent the stored original image carried by the first incoming video data stream and the stored real-time incoming original image carried by the second video data stream; and creating a first set of data structures in said memory for storing values from said pixel receptors that represent variations in the original image, variations in the dynamics of the original image lighting, and variations in pixel signal values caused by the camera pixel receptors generating the first incoming video data stream representing said original image.

5. The method as in claim 4 wherein the step of comparing the video data in said second real-time video data stream representing said modified original image with the stored original image data further comprises the steps of:

creating a second set of data structures in said memory for storing data that represents variations in the second real-time original image, variations in the dynamics of the lighting, and the signal variations in pixel signal values caused by the camera pixel receptors for the second real-time original image; and comparing pixel values of said data stored in said second data structure for said second real-time original image with corresponding pixel data values stored in said first data structure to determine foreground and background elements in said second real-time original image.

6. The method as in claim 5 further comprising the steps of: comparing the data in said second real-time video data stream representing said modified original image with the stored original image data; and generating signals representing only said foreground elements for display on said alternate background replacement elements.

7. The method as in claim 6 further including the step of adding a person to said second real-time video data stream to replace at least a portion of said original image.

8. The method as in claim 6 wherein the step of forming said alternate replacement image further comprises the step of providing one of a moving video, a bitmap, or animation, or any image capable of being represented in a digital format, as the alternate replacement image.

9. A computer-aided system for digitally editing, in real-time, a video data stream representing an original image by identifying and separating portions of the original image into foreground and background elements and replacing the background elements of the original image with substitute elements to create a new image, the system comprising:

a visual display for displaying said original image contained in said video data stream;

a camera having a device associated therewith for digitizing video data representing said original image and captured by said camera;

a computer coupled to said visual display and said digitizing device;

a first memory in the computer for storing the digitized original image from said video data stream;

said camera and digitizing device capturing and digitizing a second real-time video data stream containing data representing the original image;

a second memory in the computer for storing the digitized second real-time original image from said video data stream;

a third memory in the computer for storing program instructions for comparing the digitized second real-time original image with the stored original image to detect and separate foreground and background elements;

an alternate replacement background image stored at a fourth memory available to said stored program instructions for display on said visual display;

said second real-time original image being modified by the background elements thereof being replaced with the alternate replacement background image;

said camera and associated device capturing and digitizing said modified original image having the replacement background image; and said program instructions comparing said modified original image with said stored original image to obtain only foreground elements and causing said foreground elements to be displayed upon the alternate replacement image to form the new image.

10. A computer memory product containing a program for causing real-time digital alteration of a video data stream from pixel receptors in a video camera that represents an original image by removing portions of the original image and substituting elements to create a new image, the program comprising the steps of:

causing video data in a first video data stream representing the original image to be stored in a first computer memory location;

causing a comparison of a real-time video data stream representing the original image having substitute portions added thereto with the stored original image to obtain only the substitute portions; and controlling the computer in response to program instructions stored in the memory of the computer to cause a visual display of only the substitute portions of the original image upon an alternate replacement image to form a new image.

11. The program of claim 10 further comprising the steps of:

accessing a first set of data structures in the first memory location in the computer that stores digitized video signals that represent the original image carried by the first video data stream including variations in the dynamics of the original image lighting, motion, and variations in pixel signal values caused by the video camera pixel receptors;

accessing a second set of data structures in the computer memory that stores data that represents variations of the original image with substitute portions therein in a second real-time video data stream, variations in the dynamics of the lighting of the original image, motion, and the signal variations in pixel signal values for the second real time video data stream; and controlling the computer to cause a comparison of the stored data from the second real-time video stream, including substitute portions, with the stored original image data to determine foreground and background elements.

* * * * *